United States Patent
Fujishiro

(10) Patent No.: US 12,457,657 B2
(45) Date of Patent: Oct. 28, 2025

(54) COMMUNICATION CONTROL METHOD AND RELAY NODE

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 414 days.

(21) Appl. No.: 18/045,043

(22) Filed: Oct. 7, 2022

(65) Prior Publication Data

US 2023/0059195 A1  Feb. 23, 2023

Related U.S. Application Data

(63) Continuation of application No. PCT/JP2021/014298, filed on Apr. 2, 2021.

(30) Foreign Application Priority Data

Apr. 9, 2022 (JP) ................................ 2020-070656

(51) Int. Cl.
  *H04W 76/18* (2018.01)
  *H04W 28/02* (2009.01)
  *H04W 76/27* (2018.01)

(52) U.S. Cl.
  CPC ....... *H04W 76/18* (2018.02); *H04W 28/0273* (2013.01); *H04W 76/27* (2018.02)

(58) Field of Classification Search
  None
  See application file for complete search history.

(56) References Cited

U.S. PATENT DOCUMENTS

| | | |
|---|---|---|
| 2020/0092939 A1 | 3/2020 | Kim et al. |
| 2021/0127293 A1 | 4/2021 | Hong |
| 2022/0015176 A1* | 1/2022 | Ishii ............... H04W 76/19 |

FOREIGN PATENT DOCUMENTS

WO  2020/027491 A1  2/2020

OTHER PUBLICATIONS

3GPP TS 38.401 version 16.3.0 Release 16 (Nov. 2020).*
3rd Generation Partnership Project; Technical Specification Group Radio Access Network; NR; Study on Integrated Access and Backhaul; 3GPP TR 38.874 V16.0.0; Dec. 2018; pp. 1-111; Release 16; 3GPP Organizational Partners.
Ericsson; R2; "38.331 CR on Integrated Access and Backhaul for NR"; 3GPP TSG-RAN WG2 Meeting #109-e; R2-2002406; Feb. 24-Mar. 6, 2020; pp. 1-70; Online.

(Continued)

*Primary Examiner* — Ayaz R Sheikh
(74) *Attorney, Agent, or Firm* — Studebaker Brackett PLLC

(57) ABSTRACT

A communication control method including establishing, by a relay node, a radio backhaul link for relaying communication between user equipment and a donor base station, for a cell managed by an upper node, and performing, by the relay node, an RRC re-establishment process in order to re-establish the radio backhaul link in response to detecting a failure related to the upper node. Performing the RRC re-establishment includes identifying a non-selected cell by use of cell information acquired from a lower node of the donor base station or the relay node, and performing an exclusion process for excluding the non-selected cell from targets for which the radio backhaul link is to be re-established.

5 Claims, 14 Drawing Sheets

(56) References Cited

OTHER PUBLICATIONS

Qualcomm Incorporated; "Presentation of Specification/Report to TSG: TR 38.874, Version 1.0.0"; 3GPP TSG RAN Meeting #82; RP-182329; Dec. 10-13, 2018; pp. 1-113; Sorrento, Italy.
Kyocera; "Possible Issues on Backhaul RLF Handling"; 3GPP TSG-RAN WG2 #109-e; R2-2000516; Revision of R2-1915598; Feb. 24-Mar. 6, 2020; pp. 1-7; Online.

* cited by examiner

COMMUNICATION CONTROL METHOD AND RELAY NODE

RELATED APPLICATIONS

The present application is a continuation based on PCT Application No. PCT/JP2021/014298, filed on Apr. 2, 2021, which claims the benefit of Japanese Patent Application No. 2020-070656 filed on Apr. 9, 2020. The content of which is incorporated by reference herein in their entirety.

TECHNICAL FIELD

The present disclosure relates to a communication control method and a relay node used in a mobile communication system.

BACKGROUND OF INVENTION

In the 3rd Generation Partnership Project (3GPP), which is a standardization project of a mobile communication system, a new relay node referred to as an Integrated Access and Backhaul (IAB) node has been under study. One or more relay nodes are disposed between user equipment and a donor base station. The relay node establishes a radio backhaul link with an upper node to perform relay for communication between the user equipment and the donor base station via the radio backhaul link (for example, see NPL 1).

Such a relay node performs relay in a Radio Resource Control (RRC) connected state in which the relay node has an RRC connection with the donor base station.

CITATION LIST

Non-Patent Literature

NPL 1: 3GPP Technical Specification "TR 38.874 V16.0.0" December 2018

SUMMARY

In a first aspect, a communication control method includes establishing, by a relay node configured to relay communication between user equipment and a donor base station, a Backhaul Adaptation Protocol (BAP) entity in response to a Radio Resource Control (RRC) message from the donor base station, in an RRC connected state in which the relay node has an RRC connection with the donor base station, transitioning, by the relay node, from the RRC connected state to an RRC inactive state, and performing, by the relay node, control to not release but maintain the BAP entity even when the relay node transitions to the RRC inactive state.

In a second aspect, a relay node relays communication between user equipment and a donor base station. The relay node includes a controller configured to establish a Backhaul Adaptation Protocol (BAP) entity in response to a Radio Resource Control (RRC) message from the donor base station, in an RRC connected state in which the relay node has an RRC connection with the donor base station. The controller makes the relay node transition from the RRC connected state to an RRC inactive state. The controller does not release but maintains the BAP entity even when making the relay node transition to the RRC inactive state.

In a third aspect, a communication control method includes establishing, by a relay node, a radio backhaul link for relaying communication between user equipment and a donor base station, for a cell managed by an upper node, and performing, by the relay node, a Radio Resource Control (RRC) re-establishment process in order to re-establish the radio backhaul link in response to detecting a failure related to the upper node. The performing the RRC re-establishment process includes identifying a non-selected cell by use of cell information acquired from a lower node of the donor base station or the relay node, and performing an exclusion process for excluding the non-selected cell from targets for which the radio backhaul link is to be re-established.

In a fourth aspect, a relay node includes a controller configured to establish a radio backhaul link for relaying communication between user equipment and a donor base station, for a cell managed by an upper node. The controller performs a Radio Resource Control (RRC) re-establishment process in order to re-establish the radio backhaul link in response to an occurrence of a failure related to the upper node. In the RRC re-establishment process, the controller identifies a non-selected cell by use of cell information acquired from a lower node of the donor base station or the relay node, and performs an exclusion process for excluding the non-selected cell from targets for which the radio backhaul link is to be re-established.

DESCRIPTION OF EMBODIMENTS

When a failure related to an upper node of a relay node occurs, or when an RRC state of the relay node changes, the relay node may not properly perform the relay.

In view of this, the present disclosure has an object to appropriately perform a relay.

A mobile communication system according to an embodiment will be described with reference to the drawings. In the description of the drawings, the same or similar parts are denoted by the same or similar reference signs.

Configuration of Mobile Communication System

Figure 1:
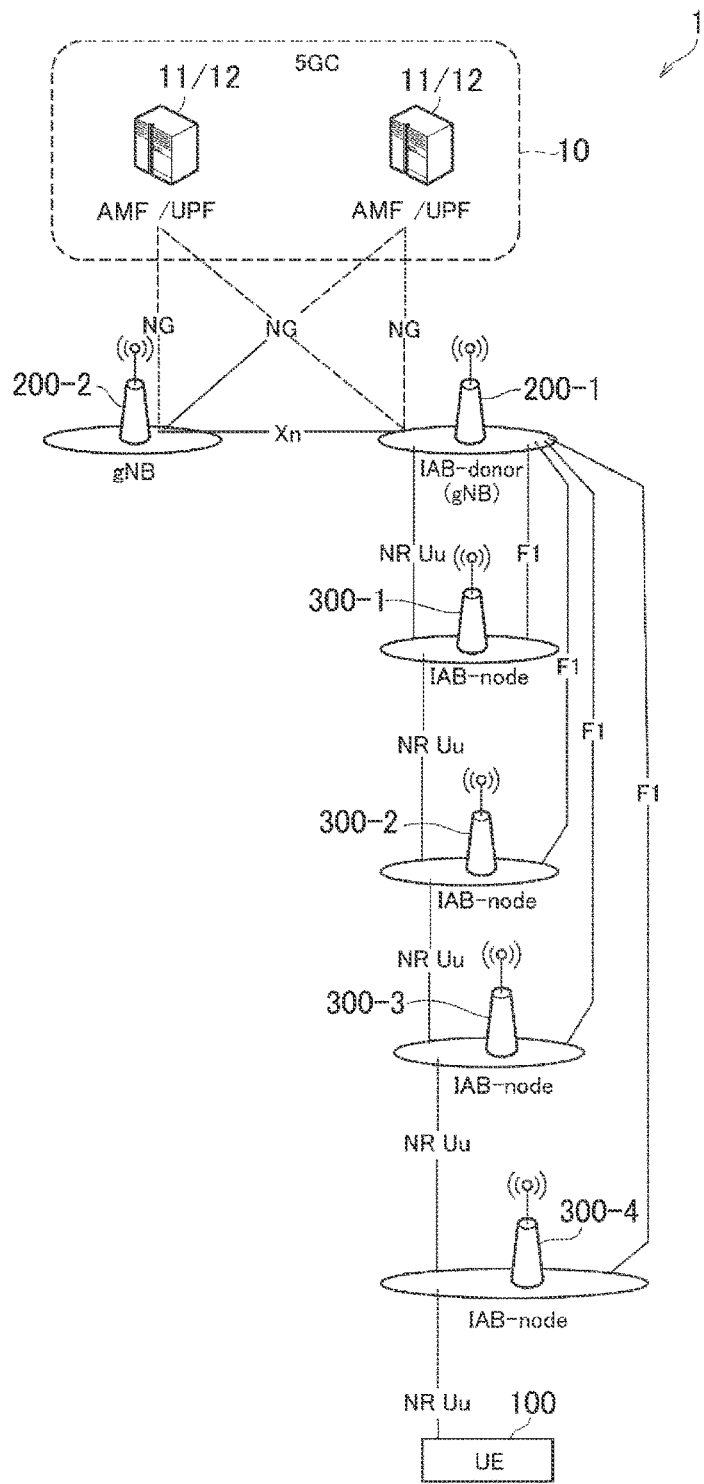
FIG. 1 is a diagram illustrating a configuration of a mobile communication system 1 according to an embodiment.

First, a configuration of a mobile communication system according to an embodiment will be described. FIG. 1 is a diagram illustrating a configuration of a mobile communication system 1 according to an embodiment.

The mobile communication system 1 is a fifth generation (5G) mobile communication system based on the 3GPP standard. Specifically, a radio access scheme in the mobile communication system 1 is New Radio (NR) being a radio access scheme of 5G. Note that Long Term Evolution (LTE) may be at least partially applied to the mobile communication system 1.

As illustrated in FIG. 1, the mobile communication system 1 includes a 5G core network (5GC) 10, user equipment (UE) 100, a base station (referred to as a gNB) 200, and an IAB node 300. The IAB node 300 is an example of a relay node. An embodiment mainly describes an example in which the base station is an NR base station. However, the base station may be an LTE base station (specifically, an eNB).

The 5GC 10 includes an Access and Mobility Management Function (AMF) 11 and a User Plane Function (UPF) 12. The AMF 11 is an apparatus that performs various types of mobility control and the like for the UE 100. By communicating with the UE 100 by using Non-Access Stratum (NAS) signaling, the AMF 11 manages information of an area in which the UE 100 exists. The UPF 12 is an apparatus that performs transfer control of user data and the like.

Each gNB 200 is a fixed wireless communication node that manages one or more cells. The term "cell" denotes a minimum unit of a wireless communication area. The term "cell" may denote a function or a resource for performing wireless communication with the UE 100. One cell belongs to one carrier frequency.

Each gNB 200 is connected to the 5GC 10 each other via an interface referred to as an NG interface. FIG. 1 illustrates an example of two gNBs, a gNB 200-1 and a gNB 200-2 that are connected to the 5GC 10.

Each gNB 200 is connected to another gNB 200 in an adjacency relationship via an inter-base station interface referred to as an Xn interface. FIG. 1 illustrates an example in which the gNB 200-1 is connected to the gNB 200-2.

Each gNB 200 may be divided into a central unit (CU) and a distributed unit (DU). The CU and the DU are connected to each other via an interface referred to as an F1 interface. The F1 protocol is a communication protocol between the CU and the DU, and includes an F1-C protocol corresponding to a protocol for a control plane and an F1-U protocol corresponding to a protocol for a user plane.

The mobile communication system 1 supports an IAB that uses NR for the backhaul to enable wireless relay of NR access. The donor gNB 200-1 is a gNB 200 corresponding to a terminal node of the NR backhaul on the network side and including additional functions that support the IAB. The backhaul is capable of multi-hop via a plurality of hops (i.e., a plurality of IAB nodes 300).

Each IAB node 300 includes a DU functional processor and a mobile termination (MT) functional processor.

The MT is connected to the DU of an upper node (an upper IAB node 300 or a donor gNB 200-1). The MT is connected to the CU of the donor gNB 200-1 by using RRC, and establishes, with the donor gNB 200-1, a signaling radio bearer (SRB) that carries an RRC message and an NAS message. An adjacent node on an NR Uu wireless interface of the MT (i.e., an upper node) may be referred to as a "parent node".

The DU manages cells similarly to the gNB 200. The DU terminates the NR Uu wireless interface to the UE 100 and a lower IAB node 300. The DU supports the F1 protocol for the CU of the donor gNB 200-1. An adjacent node on an NR access interface of the DU (i.e., lower node) may be referred to as a "child node".

All IAB nodes 300 connected to the donor gNB 200-1 via one or more hops form an IAB topology rooted in the donor gNB 200-1. Such an IAB topology may also be referred to as a Directed Acyclic Graph (DAG). In the IAB topology, the direction of the parent node may be referred to as "upstream" or "upper", and the direction of the child node may be referred to as "downstream" or "lower".

The MT of each IAB node 300 in the IAB topology establishes a radio backhaul link with the DU of the parent node (IAB node 300 or donor gNB 200-1). The MT of the IAB node 300 establishes one radio backhaul link with one parent node.

The DU of the IAB node 300 configures one of the cells managed by the DU as a serving cell of the MT, for the MT of the child node having established a radio backhaul link with the IAB node 300 itself. The serving cell is a cell that provides radio resources used on the radio backhaul link. The DU of the IAB node 300 may configure a cell group (CG) including a plurality of serving cells for the MT of the child node.

The IAB node 300 may include a plurality of parent nodes. In other words, one IAB node 300 may establish a radio backhaul link with each of the plurality of IAB nodes 300 as the parent nodes. For example, the IAB node 300 may have dual connectivity to two parent nodes. One of the two parent nodes is a master node (MN), and the other is a secondary node (SN). The DU of each of the MN and the SN configures a serving cell (or a CG) for the MT of the IAB node 300 that is the child node. The radio backhaul link between the IAB node 300 and the MN may be referred to as a Master Cell Group (MCG) link, and the radio backhaul link between the IAB node 300 and the SN may be referred to as a Secondary Cell Group (SCG) link.

FIG. 1 illustrates an example in which an IAB node 300-1 is wirelessly connected to the donor gNB 200-1, an IAB node 300-2 is wirelessly connected to the IAB node 300-1, an IAB node 300-3 is wirelessly connected to the IAB node 300-2, an IAB node 300-4 is wirelessly connected to the IAB node 300-3, and the F1 protocol is transmitted via four backhaul hops.

The UE 100 is a mobile wireless communication apparatus that can perform wireless communication with cells. The UE 100 may be any type of apparatus as long as the UE 100 is an apparatus that performs wireless communication with the gNB 200 or the IAB node 300. For example, the UE 100 is a mobile phone terminal, a tablet terminal, a notebook PC, a sensor or an apparatus provided in the sensor, and/or a vehicle or an apparatus provided in the vehicle. The UE 100 is wirelessly connected to an upper node (IAB node 300 or gNB 200) via a radio access link. When the IAB node 300 having the radio access link with the UE 100 and relays communication of the UE 100, the IAB node 300 operates as an access IAB node 300 of the UE 100.

FIG. 1 illustrates an example in which the UE 100 is wirelessly connected to the IAB node 300-4. The UE 100 indirectly communicates with the donor gNB 200-1 via the IAB node 300-4, the IAB node 300-3, the IAB node 300-2, and the IAB node 300-1. Specifically, the IAB node 300-4, the IAB node 300-3, the IAB node 300-2, and the IAB node 300-1 relay uplink data from the UE 100 to the donor gNB 200-1 and relay downlink data from the gNB 200-1 to the UE 100.

Figure 2:
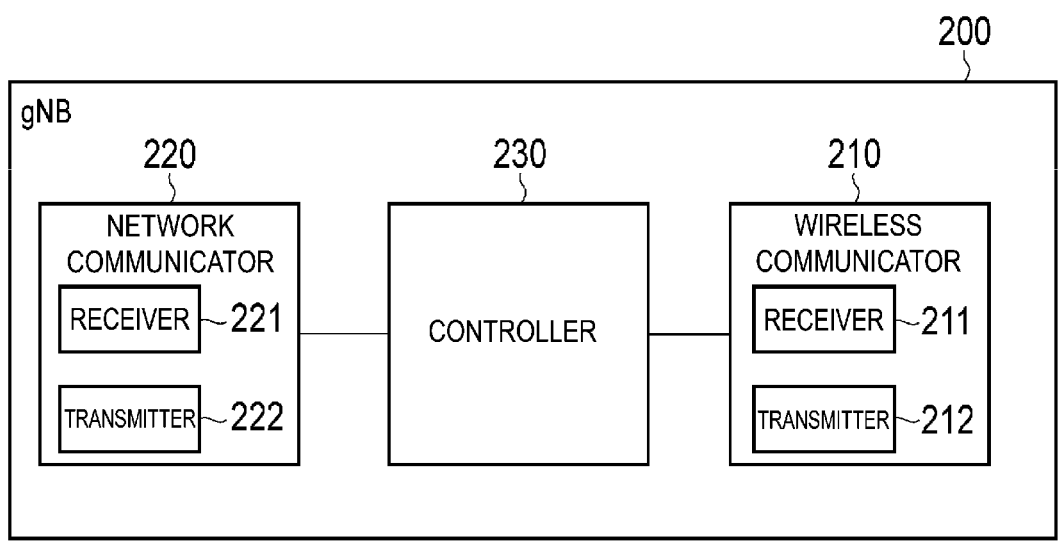
FIG. 2 is a diagram illustrating a configuration of a gNB 200.

A configuration of the gNB 200, corresponding to a base station according to an embodiment, will be described. FIG. 2 is a diagram illustrating a configuration of the gNB 200. As illustrated in FIG. 2, the gNB 200 includes a wireless communicator 210, a network communicator 220, and a controller 230.

The wireless communicator 210 performs wireless communication with the UE 100 and performs wireless communication with the IAB node 300. The wireless communicator 210 includes a receiver 211 and a transmitter 212. The receiver 211 performs various kinds of receptions under control of the controller 230. The receiver 211 includes an antenna, and converts a radio signal received by the antenna into a baseband signal (received signal) and outputs the baseband signal to the controller 230. The transmitter 212 performs various kinds of transmissions under control of the controller 230. The transmitter 212 includes an antenna, and converts a baseband signal (transmission signal) to be output by the controller 230 into a radio signal and transmits the radio signal from the antenna.

The network communicator 220 performs wired communication (or wireless communication) with the 5GC 10 and performs wired communication (or wireless communication) with another adjacent gNB 200. The network communicator 220 includes a receiver 221 and a transmitter 222. The receiver 221 performs various kinds of receptions under control of the controller 230. The receiver 221 receives a signal from the outside and outputs the received signal to the controller 230. The transmitter 222 performs various kinds of transmissions under control of the controller 230. The transmitter 222 transmits a transmission signal output by the controller 230 to the outside.

The controller 230 performs various types of control for the gNB 200. The controller 230 includes at least one memory and at least one processor electrically connected to the memory. The memory stores programs to be executed by the processor and information to be used for processes by the processor. The processor may include a baseband processor and a Central Processing Unit (CPU). The baseband processor performs modulation and demodulation, and coding and decoding of a baseband signal, and the like. The CPU executes the programs stored in the memory to perform various types of processes. The processor performs processing of the layers described below.

Figure 3:
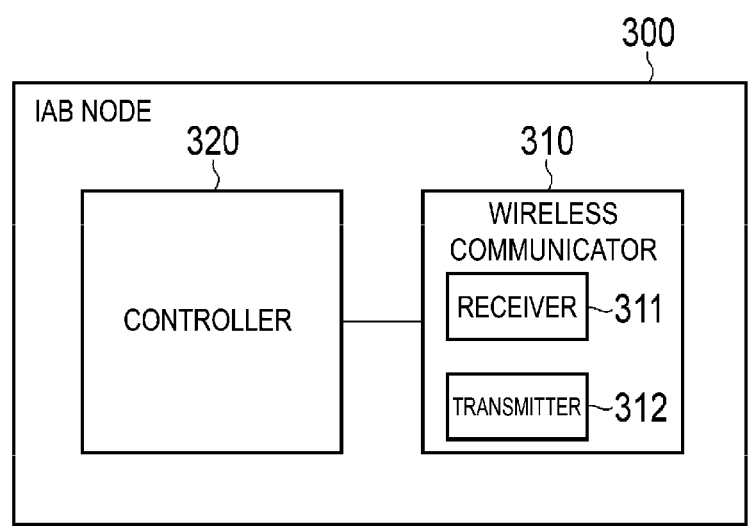
FIG. 3 is a diagram illustrating a configuration of an IAB node 300.

A configuration of the IAB node 300 that is a relay node according to an embodiment will be described. FIG. 3 is a diagram illustrating a configuration of the IAB node 300. As illustrated in FIG. 3, the IAB node 300 includes a wireless communicator 310 and a controller 320. The IAB node 300 may include a plurality of wireless communicators 310.

The wireless communicator 310 performs wireless communication (radio backhaul link) with the gNB 200 or other IAB nodes 300, and performs wireless communication (radio access link) with the UE 100. The wireless communicator 310 for radio backhaul link communication and the wireless communicator 310 for radio access link communication may be provided separately.

The wireless communicator 310 includes a receiver 311 and a transmitter 312. The receiver 311 performs various kinds of receptions under control of the controller 320. The receiver 311 includes an antenna, and converts a radio signal received by the antenna into a baseband signal (received signal) and outputs the baseband signal to the controller 320.

The transmitter 312 performs various kinds of transmissions under control of the controller 320. The transmitter 312 includes an antenna, and converts a baseband signal (transmission signal) to be output by the controller 320 into a radio signal and transmits the radio signal from the antenna.

The controller 320 performs various types of control in the IAB node 300. The controller 320 includes at least one memory and at least one processor electrically connected to the memory. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various types of processes. The processor performs processing of the layers described below.

Note that, although illustration is omitted in FIG. 3, the IAB node 300 may include a Global Navigation Satellite System (GNSS) receiver. The IAB node 300 need not include a GNSS receiver.

Figure 4:
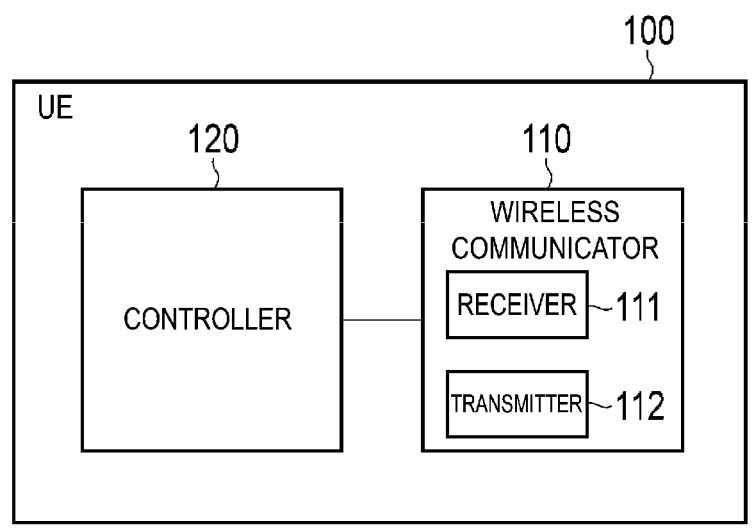
FIG. 4 is a diagram illustrating a configuration of UE 100.

A configuration of the UE 100, corresponding to user equipment according to an embodiment, will be described. FIG. 4 is a diagram illustrating a configuration of the UE 100. As illustrated in FIG. 4, the UE 100 includes a wireless communicator 110 and a controller 120.

The wireless communicator 110 performs wireless communication in the radio access link, specifically, wireless communication with the gNB 200 and wireless communication with the IAB node 300. The wireless communicator 110 includes a receiver 111 and a transmitter 112. The receiver 111 performs various kinds of receptions under control of the controller 120. The receiver 111 includes an antenna, and converts a radio signal received by the antenna into a baseband signal (received signal) and outputs the baseband signal to the controller 120. The transmitter 112 performs various kinds of transmissions under control of the controller 120. The transmitter 112 includes an antenna, and converts a baseband signal (transmission signal) to be output by the controller 120 into a radio signal and transmits the radio signal from the antenna.

The controller 120 performs various kinds of controls for the UE 100. The controller 120 includes at least one memory and at least one processor electrically connected to the memory. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various types of processes. The processor performs processing of the layers described below.

Note that, although illustration is omitted in FIG. 4, the UE 100 may include a GNSS receiver. The UE 100 need not include a GNSS receiver.

Protocol Stack

Figure 5:
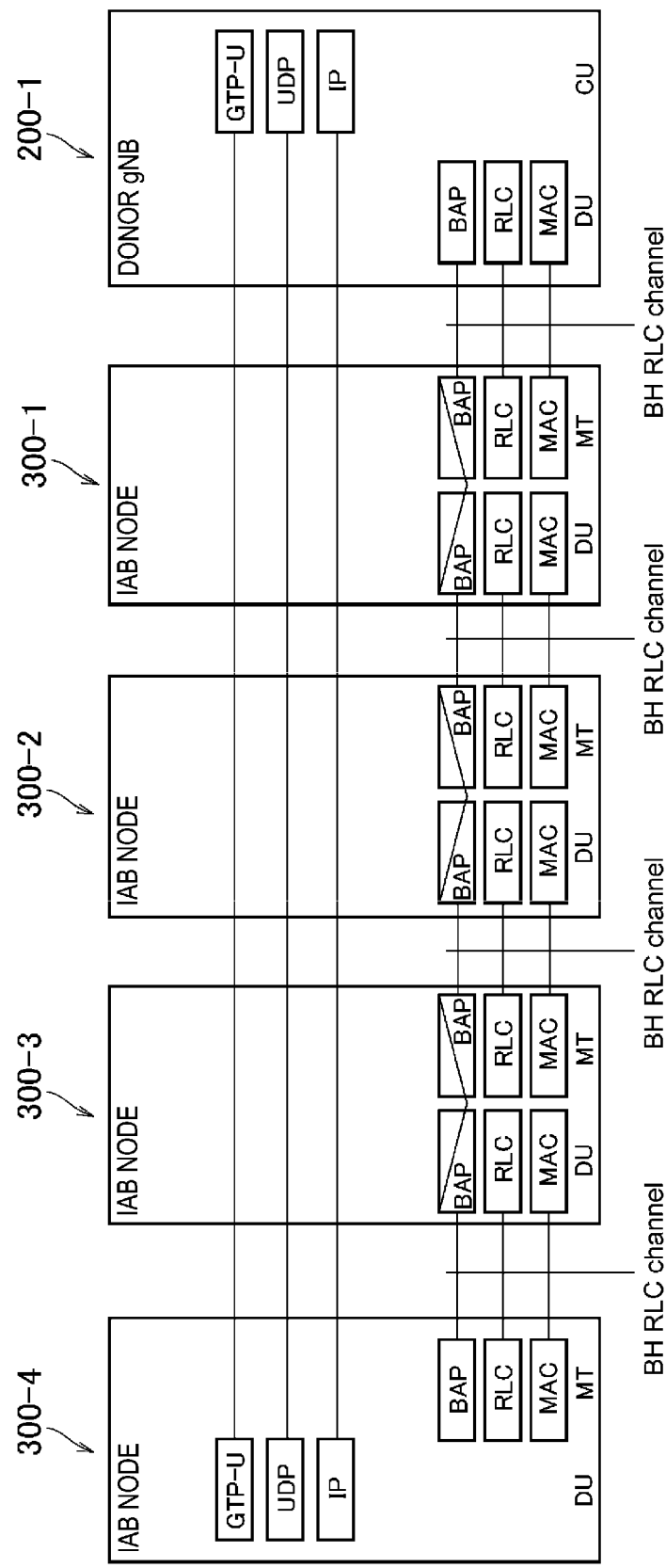
FIG. 5 is a diagram illustrating an example of a protocol stack of a user plane.

An example of a protocol stack configuration in the mobile communication system 1 according to an embodiment will be described. FIG. 5 is a diagram illustrating an example of a protocol stack of a user plane.

As illustrated in FIG. 5, each of the DU of the IAB node 300-4 and the CU of the donor gNB 200-1 includes a higher layer of the user plane (hereinafter, referred to as a "UP higher layer"). The UP higher layer of the DU of the IAB node 300-4 and the UP higher layer of the CU of the donor gNB 200-1 communicate with each other via the IAB nodes 300-1 to 300-3. The UP higher layer includes layers of Internet Protocol (IP), User Datagram Protocol (UDP), and GPRS Tunnelling Protocol for User Plane (GTP-U).

Each of the IAB nodes 300-1 to 300-3 includes the MT and DU functional processors. The MT includes layers of Backhaul Adaptation Protocol (BAP), Radio Link Control (RLC), and Medium Access Control (MAC). The DU includes the layers of BAP, RLC, and MAC. FIG. 5 illustrates an example in which the BAP layer of the DU and the BAP layer of the MT are separately provided; however, the BAP layer of the DU and the BAP layer of the MT may be integrated.

Data packets transmitted and received between the UP higher layer of the DU of the IAB node 300-4 and the UP higher layer of the CU of the donor gNB 200-1 are relayed via the BAP layers of the IAB nodes 300-1 to 300-3.

Figure 6:
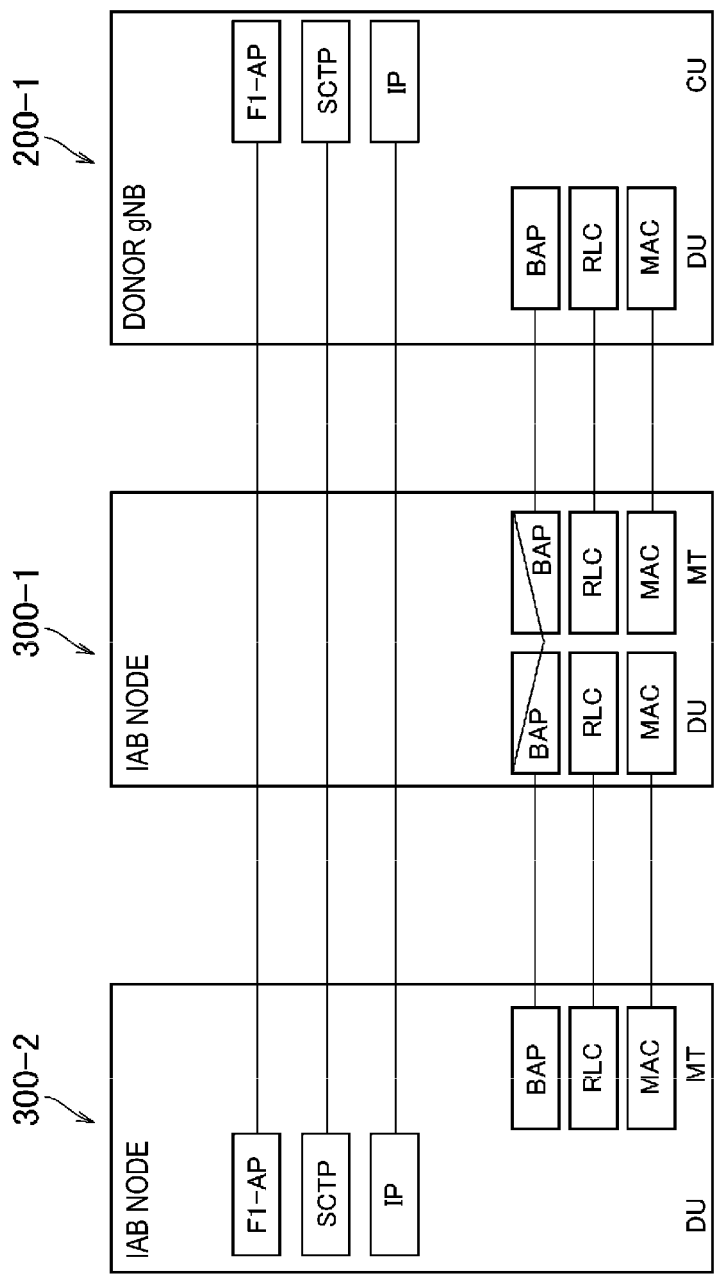
FIG. 6 is a diagram illustrating an example of a protocol stack of a control plane including an application protocol layer.

FIG. 6 is a diagram illustrating an example of a protocol stack of the control plane. As illustrated in FIG. 6, an F1 application protocol (F1-AP) layer of the CU and an F1-AP layer of the DU of the IAB node 300-2 communicate with each other via the IAB node 300-1. Each of the donor gNB 200-1 and the IAB node 300-2 includes layers of Stream Control Transmission Protocol (SCTP) and the IP.

Note that, although illustration is omitted in FIG. 6, the F1-AP layer of the CU and the F1-AP layer of the DU of the IAB node 300-1 communicate with each other. The F1-AP layer of the CU and the F1-AP layer of the DU of the IAB node 300-2 communicate with each other.

Figure 7:
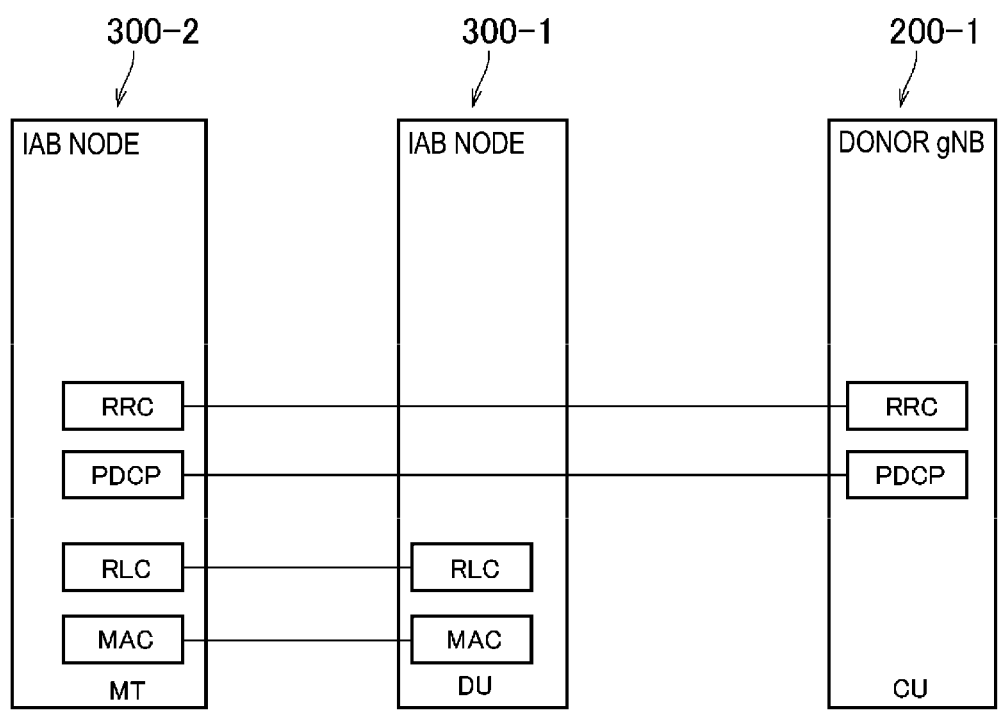
FIG. 7 is a diagram illustrating an example of the protocol stack of the control plane including a radio resource control (RRC) layer.

FIG. 7 is a diagram illustrating an example of a protocol stack of the control plane. As illustrated in FIG. 7, the RRC layer of the CU and the RRC layer of the MT of the IAB node 300-2 communicate with each other via the IAB node 300-1.

Note that, although illustration is omitted in FIG. 7, the RRC layer of the CU and the RRC layer of the MT of the IAB node 300-1 communicate with each other. The RRC layer of the CU and the RRC layer of the MT of the IAB node 300-2 communicate with each other.

Note that, although illustrations are omitted in FIGS. 5 to 7, the PHY layer is installed under the MAC layer of each node.

Each protocol will be described. The PHY layer performs coding and decoding, modulation and demodulation, antenna mapping and demapping, and resource mapping and demapping. Between the PHY layers, data and control information are transmitted via a physical channel.

The MAC layer performs preferential control of data, a retransmission process through a hybrid ARQ (HARQ), and the like. Between the MAC layers, data and control information are transmitted via a transport channel. The MAC layer of the donor gNB 200-1 and the MAC layer of the DU include a scheduler. The scheduler determines transport formats (transport block sizes, modulation and coding schemes (MCSs)) in the uplink and the downlink and resource blocks to be allocated to the UE 100.

The RLC layer transmits data to the RLC layer on the reception side by using functions of the MAC layer and the PHY layer. Data and control information are transmitted between the RLC layers via a logical channel.

As illustrated in FIG. 5, a backhaul RLC channel (BH RLC channel) is established between the RLC layer of each IAB node 300, and the RLC layer of the parent node and the child node of the IAB node 300. The BH RLC channel will be described later in detail.

The BAP layer performs, in the user plane, a routing process and a bearer mapping and demapping process. The processes in the BAP layer will be described later in detail.

The RRC layer transmits RRC signaling for various configurations. The RRC layer controls a logical channel, a transport channel, and a physical channel according to establishment, reestablishment, and release of a radio bearer. When there is RRC connection between the RRC layers, the IAB node 300 is in an RRC connected state. When there is no RRC connection between the RRC layers, the IAB node 300 is in an RRC idle state.

When the RRC connection is inactive, the IAB node 300 is in an RRC inactive state. The RRC inactive state is different from both the RRC idle state and the RRC connected state. In the RRC inactive state, a context of the IAB node 300 is stored in the IAB node 300 and the donor gNB 200-1 (5GC 10) in a similar manner to the RRC connected state.

The context may be an AS context for the IAB node 300. The AS context may include information for RRC re-establishment. The AS context may include radio access capabilities of the IAB node 300. The context may include a security context. The security context may include KeNB, token, NCC, EPS security capability, and security algorithm.

IAB Topology

Figure 8:
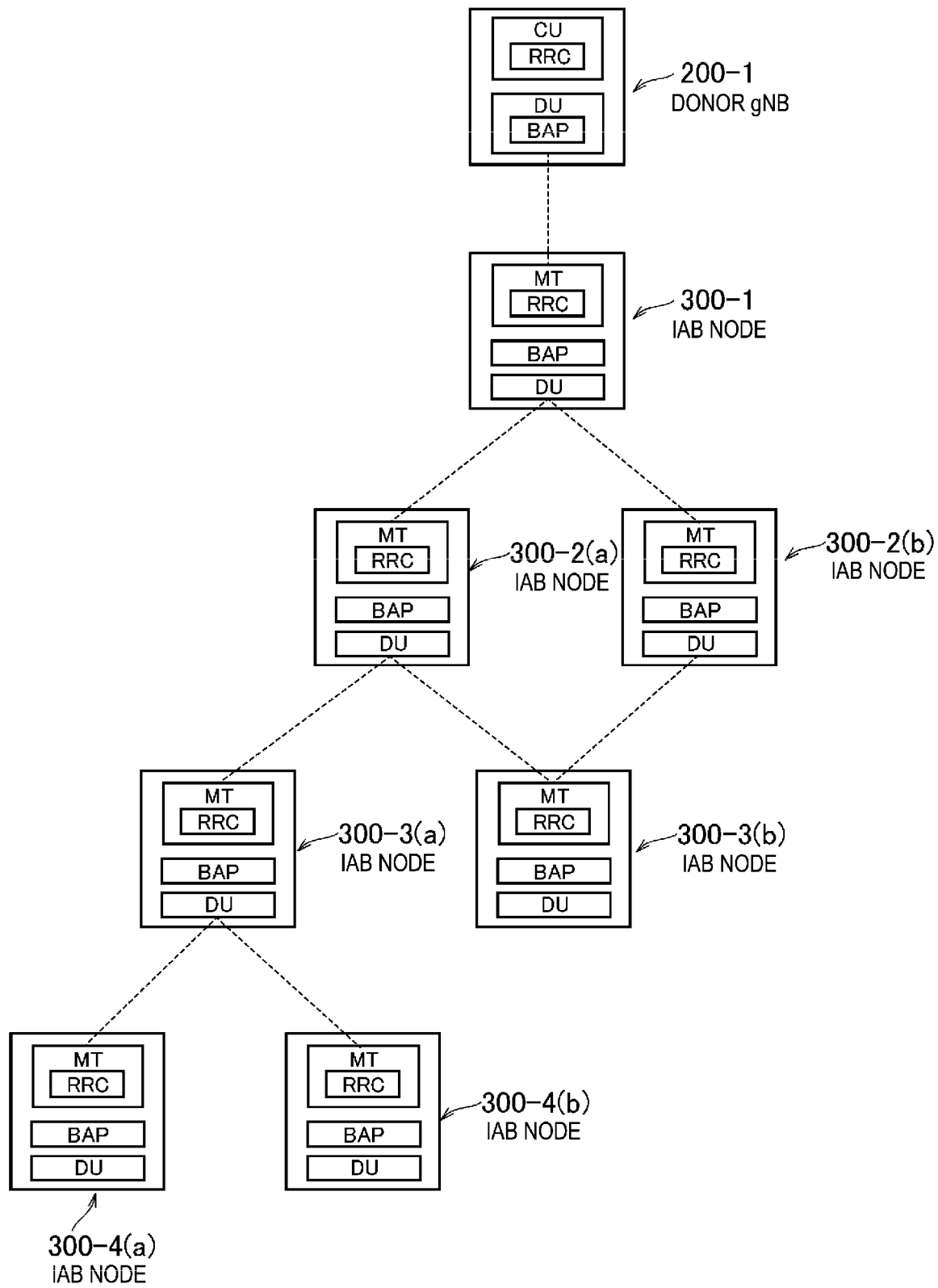
FIG. 8 is a diagram illustrating an IAB topology according to an embodiment.

The IAB topology according to an embodiment will be described. FIG. 8 is a diagram illustrating an example of the IAB topology according to an embodiment. As illustrated in FIG. 8, the IAB topology includes an IAB node 300-1, an IAB node 300-2(*a*), an IAB node 300-2(*b*), an IAB node 300-3(*a*), an IAB node 300-3(*b*), an IAB node 300-4(*a*), and an IAB node 300-4(*b*). The MT of each IAB node 300 establishes a radio backhaul link with a DU of the corresponding parent node. In FIG. 8, a radio backhaul link is illustrated by a dashed line. Note that, although illustration is omitted in FIG. 8, the UE 100 may be connected to the DU of each IAB node 300.

The IAB node 300-3(*b*) has dual connectivity with the IAB nodes 300-2(*a*) and 300-2(*b*). In other words, the parent nodes of the IAB node 300-3(*b*) are the IAB nodes 300-2(*a*) and 300-2(*b*). Each IAB node 300 other than the IAB node 300-3(*b*) has only one parent node.

The donor gNB 200-1 configures a relay route between the donor gNB 200-1 itself and each IAB node 300. The relay route configured for each IAB node 300 allows communication between a communication apparatus served by the IAB node 300 and the donor gNB 200-1. The communication apparatus served by the IAB node 300 includes the MT of the child node having the radio backhaul link with the DU of the IAB node 300, and the UE 100 having the radio access link with the DU of the IAB node 300.

The donor gNB 200-1 may configure a plurality of relay routes for the IAB node 300 including a plurality of parent nodes.

In FIG. 8, the donor gNB 200-1 may configure four relay routes described below in the IAB topology.

Relay route #1: donor gNB 200-1 <--> IAB node 300-1 <--> IAB node 300-2(*a*) <--> IAB node 300-3(*b*)

Relay route #2: donor gNB 200-1 <--> IAB node 300-1 <--> IAB node 300-2(*a*) <--> IAB node 300-3(*a*) <--> IAB node 300-4(*a*)

Relay route #3: donor gNB 200-1 <--> IAB node 300-1 <--> IAB node 300-2(*a*) <--> IAB node 300-3(*a*) <--> IAB node 300-4(*b*)

Relay route #4: donor gNB 200-1 <--> IAB node 300-1 <--> IAB node 300-2(*b*) <--> IAB node 300-3(*b*)

The donor gNB 200-1 assigns, to each relay route in the IAB topology, a route identifier for identifying the relay route. The donor gNB 200-1 assigns, to each IAB node 300 in the IAB topology, an IAB identifier for identifying the IAB node 300 in the IAB topology. The IAB identifier may be a BAP address assigned to the BAP layer (BAP entity).

The donor gNB 200-1 transmits, to each IAB node 300 in the IAB topology, routing configuration information related to the relay route passing through the IAB node 300. Each IAB node 300 stores the routing configuration information. The routing configuration information is transmitted by an RRC message or an F1AP message.

The routing configuration information transmitted to the IAB node 300 includes a route identifier of the relay route (one or more relay routes) passing through the IAB node 300 and an IAB identifier of a node next to the IAB node 300 (that is, child and/or parent node) in the relay route passing through the IAB node 300. A node next to an IAB node 300 in the relay route may be referred to as a "NEXT HOP" of the IAB node.

For example, in FIG. 8, the donor gNB 200-1 transmits, to the IAB node 300-2(*a*), the routing configuration information related to the relay routes #1 to #3 passing through the IAB node 300-2(*a*). The routing configuration information includes an information set #1 corresponding to the relay route #1, an information set #2 corresponding to the relay route #2, and an information set #3 corresponding to the relay route #3.

The information set #1 includes the root identifier of the relay route #1 and the IAB identifiers of the NEXT HOPs (IAB node 300-1 and IAB node 300-3(*b*)) of the IAB node 300-2(*a*) in the relay route #1.

The information set #2 includes the root identifier of the relay route #2 and the IAB identifiers of the NEXT HOPs (IAB node 300-1 and IAB node 300-3(*a*)) of the IAB node 300-2(*a*) in the relay route #2.

The information set #3 includes the root identifier of the relay route #3 and the IAB identifiers of the NEXT HOPs (IAB node 300-1 and IAB node 300-3(*a*)) of the IAB node 300-2(*a*) in the relay route #3.

To transmit the data packet addressed to a predetermined communication apparatus (the MT of the IAB node 300 or the UE 100), the donor gNB 200-1 specifies one relay route to the IAB node 300 serving the communication apparatus. The donor gNB 200-1 identifies a child node in the specified relay route, and transmits the data packets and the root identifier of the specified relay route together to the child node.

The IAB node 300 performs a routing process based on routing configuration information.

In the routing process based on the routing configuration information, to transmit the data packets addressed to the donor gNB 200-1 from the communication apparatus served by the IAB node 300, the serving IAB node 300 refers to the routing configuration information to specify one relay route from among a plurality of relay routes. The IAB node 300 identifies a parent node (that is, the NEXT HOP) in the specified relay route, and transmits the data packets and the root identifier of the specified relay route together to the parent node.

In the routing process based on routing configuration information, the IAB node 300 performs routing in an upstream direction. In the routing in the upstream direction, the IAB node 300 receives, from the child node, the data packets addressed to the donor gNB 200-1 and the root identifier of the relay route specified for the data packets. The IAB node 300 identifies the parent node (that is, the "NEXT HOP") in the specified relay route based on the route identifier and the routing configuration information, and transmits the data packets and the route identifier together to the parent node.

In the routing process based on the routing configuration information, the IAB node 300 performs routing in a downstream direction. In the routing in the downstream direction, the IAB node 300 receives, from the parent node, the data packets addressed to a communication apparatus other than the IAB node 300 itself and the root identifier of the relay route specified for the data packets. The IAB node 300 identifies the child node (that is, the "NEXT HOP") in the specified relay route based on the route identifier and the routing configuration information, and transmits the data packets and the route identifier together to the identified child node.

To establish the F1-AP connection with the CU of the donor gNB 200-1, the DU of the IAB node 300 may notify the donor gNB 200-1 of the cell identifier of the cell managed by the DU of the IAB node 300. This allows the donor gNB 200-1 to grasp the cell identifier of the cell managed by the DU of each IAB node 300 in the IAB topology.

To transmit the routing configuration information to each IAB node 300, the donor gNB 200-1 may associate the cell identifier of the cell (hereinafter, referred to as a "NEXT HOP cell") managed by the DU of the IAB node 300 corresponding to the "NEXT HOP" with the IAB identifier of the "NEXT HOP" for transmission. The IAB node 300 receiving the routing configuration information including the cell identifier of the NEXT HOP cell can grasp the cell identifier of the cell managed by the DU of the parent node and/or the child node of the IAB node 300.

First Embodiment

A first embodiment will be described below. The first embodiment relates to a failure (Radio Link Failure (RLF)) of a radio backhaul link in the IAB topology described above. Such an RLF is referred to as a BH RLF.

In the first embodiment, the MT of the IAB node 300 detects a BH RLF, for example, as described below, and performs a process for recovery from the BH RLF.

Firstly, when an out-of-synchronization state (out-of-sync) is detected N310 consecutive times, the MT detects a radio problem and starts a timer T310. After starting the timer T310, the MT stops the timer T310 when an in-synchronization state (in-sync) is detected N311 consecutive times.

Secondly, when the timer T310 is expired without being stopped, the MT detects an RLF and starts a timer T311 (i.e., initiates an RRC re-establishment process), and performs a cell selection process in order to re-establish the radio backhaul link. When an appropriate cell is selected by a cell selection process and the radio backhaul link is re-established for the cell selected, the MT stops the timer T311. The appropriate cell refers to a cell that meets at least a minimum radio quality criterion.

Thirdly, when the timer T311 is expired with unsuccessful re-establishment of the radio backhaul link, the MT transitions to the RRC idle state. A failure in recovery from a BH RLF (i.e., the timer T311 expires) following the detection of the BH RLF is hereinafter referred to as a failure in radio backhaul link re-establishment (recovery).

When the MT of the IAB node 300 fails to re-establish the radio backhaul link, the BAP entity of IAB node 300 transmits a failure notification message to the BAP entity of the lower IAB node 300. The failure notification message is a message belonging to the BAP layer. Such a failure notification message is hereinafter referred to as the "BH RLF notification message". The failure notification message may also be referred to as a "recovery failure message".

When the BAP entity of the lower IAB node 300 receives a BH RLF notification message from the BAP entity of the IAB node 300 used as the upper node of the lower IAB node 300 itself, the BAP entity of the lower IAB node 300 notifies the MT of the lower IAB node 300 itself of the reception, and the MT initiates a process for recovering the radio backhaul link, for example, an RRC re-establishment process. When the RRC re-establishment processing is initiated, the MT starts the timer T311 and performs the cell selection process in order to re-establish the radio backhaul link.

Assume that a failure related to the upper node (the IAB node 300-1) of the IAB node 300-2(a) occurs in FIG. 8. The occurrence of the failure related to the upper node of the IAB node 300-2(a) includes at least one of the detection of the BH RLF with the upper node by the IAB node 300-2(a) and the reception of the BH RLF notification message from the upper node by the IAB node 300-2(a).

In this case, the MT of the IAB node 300-2(a) initiates the cell selection process in a process to re-establish a radio backhaul link (RRC re-establishment process). At this time point (the time point of initiating the cell selection process), the child node (e.g., the IAB node 300-3(a)) of the IAB node 300-2(a) operates normally. For example, the DU of the IAB node 300-3(a) continues to transmit a Synchronization Signal and PBCH block (SSB) corresponding to a downlink signal used for measuring and detecting the cell.

Thus, when the MT of the IAB node 300-2(a) performs the cell selection process in the RRC re-establishment process, the MT of the IAB node 300-2(a) may detect that a cell managed by the DU of the child node of the IAB node 300-2(a) is an appropriate cell. However, since the IAB node 300-2(a) does not have an available radio backhaul link, the child node cannot communicate with the donor gNB 200-1.

As a result, if the IAB node 300-2(a) selects the cell managed by the DU of the child node, unfortunately, the IAB node 300-2(a) is unable to re-establish the RRC connection with the donor gNB 200-1 and thus unable to provide the relay function based on the IAB. In particular, when the IAB node 300-2(a) is located physically close to the child node (wireless condition is good), such a problem is prominent.

Note that in the following, the cell managed by the DU of the child node of the IAB node 300 is referred to as the "child node DU cell" of the IAB node 300. The cell managed by the DU of the parent node of the IAB node 300 is referred to as the "parent node DU cell" of the IAB node 300.

The first embodiment is an embodiment for solving the problem described above. In the first embodiment, the IAB node 300 performs the RRC re-establishment process in order to re-establish the radio backhaul link in response to an occurrence of a failure related to the upper node. In the RRC re-establishment process, the IAB node 300 performs a process to identify a non-selected cell by use of cell information acquired from the lower node of the donor gNB 200-1 or the IAB node 300. The IAB node 300 performs the exclusion process for excluding the non-selected cell from the targets for which the radio backhaul link is to be re-established. The cell information includes at least information for identifying the child node DU cell of the IAB node 300. The non-selected cell is to be excluded from the targets of the re-establishment when the IAB node 300 performs the RRC re-establishment.

Operation Examples 1 to 4 according to the first embodiment will be described below.

Operation Example 1

In Operation Example 1, the IAB node 300 identifies the non-selected cell by use of predetermined information acquired from the donor gNB 200-1 as the cell information. The predetermined information may be a prohibited cell list.

The prohibited cell list includes cell identifiers of prohibited cells configured by the donor gNB 200-1 for the IAB node 300. In performing the RRC re-establishment, the IAB node 300 does not select the prohibited cell.

The donor gNB 200-1 configures the prohibited cell for the IAB node 300 in consideration of possibility that the IAB node 300 is to perform the RRC re-establishment, and transmits the prohibited cell list to the IAB node 300. The prohibited cell list is transmitted by an RRC message or an F1-AP message.

The donor gNB 200-1 configures a cell managed by the DU of the child node of the IAB node 300 (hereinafter, referred to as the "child node DU cell") as the prohibited cell for the IAB node 300. The donor gNB 200-1 may further configure a cell managed by a DU of a grandchild node (a child node of the child node) of the IAB node 300 (hereinafter, referred to as the "grandchild node DU cell") as the prohibited cell. The donor gNB 200-1 may further configure a cell managed by a DU of a great-grandchild node (a child node of the grandchild node) of the IAB node 300 (hereinafter, referred to as the "great-grandchild node DU cell") as the prohibited cell. In a similar manner, the donor gNB 200-1 may configure, as for all IAB nodes 300 in the downstream direction of the IAB node 300, a cell managed by a DU of the IAB node 300 in the downstream direction as the prohibited cell.

The donor gNB 200-1 may identify, among the child nodes of the IAB node 300, an IAB node 300 having a plurality of radio backhaul links (i.e., the IAB node 300 including a plurality of parent nodes), and may not configure a cell managed by the identified IAB node 300 as a selection prohibited cell. When the IAB node 300 has a plurality of radio backhaul links and one of the radio backhaul links is unavailable, the IAB node 300 can communicate with the donor gNB 200-1 via any one of the other radio backhaul links. Thus, the IAB node 300 may select a cell managed by the child node having a plurality of radio backhaul links in performing the cell selection process in the RRC re-establishment process.

The IAB node 300 identifies, as a non-selected cell, a cell included in the prohibited cell list among the cells detected in the cell selection process.

The predetermined information may be routing configuration information including the cell identifier of the NEXT HOP cell described above. In this case, the IAB node 300 identifies, as a non-selected cell, the cell identifier of the cell (the child node DU cell) managed by the DU of the child node (i.e., the NEXT HOP in the downstream direction) of the IAB node 300 itself, based on the cell identifier of the NEXT HOP cell included in such routing configuration information.

Figure 9:
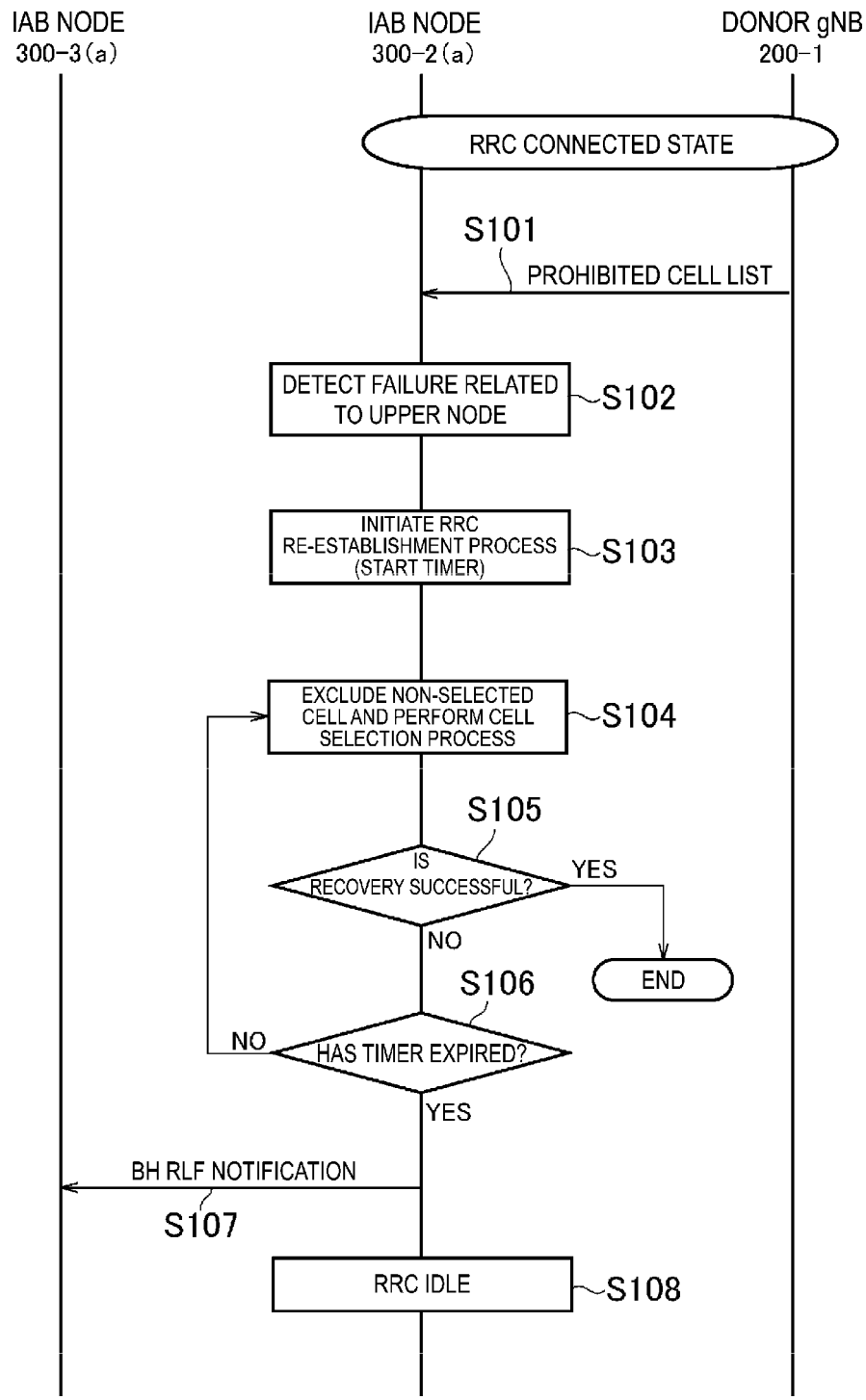
FIG. 9 is a diagram illustrating operations of Operation Example 1 according to a first embodiment.

FIG. 9 is a diagram illustrating operations of Operation Example 1. In FIG. 9, Operation Example 1 in which the predetermined information is the prohibited cell list will be described, but the predetermined information may be the routing configuration information in Operation Example 1.

As illustrated in FIG. 9, the IAB node 300-2(*a*) initiates the process in an RRC connected state in which the IAB node 300-2(*a*) has an RRC connection with the donor gNB 200-1.

In step S101, the IAB node 300-2(*a*) receives the prohibited cell list from the donor gNB 200-1. The IAB node 300-2(*a*) stores the cell identifier included in the prohibited cell list.

In step S102, the IAB node 300-2(*a*) detects a failure related to the upper node (the IAB node 300-1). Here, the detecting the failure related to the upper node (the IAB node 300-1) includes at least one of detecting, by the IAB node 300-2(*a*), the BH RLF with the IAB node 300-1, and receiving, by the IAB node 300-2(*a*), the BH RLF notification message from the IAB node 300-1.

In step S103, the MT of the IAB node 300-2(*a*) initiates the RRC re-establishment process in order to re-establish the radio backhaul link of the IAB node 300-2(*a*) in response to detecting the failure related to the upper node (the IAB node 300-1). The MT starts the timer T311 and initiates the cell selection process (step S104).

In step S104, the MT of the IAB node 300-2(*a*) performs cell search, and identifies, as a non-selected cell, a cell identified by the cell identifier stored in step S101 (i.e., the cell identifier included in the prohibited cell list) among a plurality of searched cells. The MT performs the exclusion process for excluding the non-selected cell from the targets for which the radio backhaul link of the IAB node 300-2(*a*) is to be re-established. The MT performs the exclusion process like this, and then, selects an appropriate cell as a target for which the radio backhaul link is to be re-established.

In step S105, the MT of the IAB node 300-2(*a*) determines whether the RRC re-establishment process is successful (i.e., the recovery of the radio backhaul link is successful) in the cell selected in the cell selection process. If the recovery of the radio backhaul link is successful (step S105: YES), the MT stops the timer T311, and the flow is terminated.

If the recovery of the radio backhaul link is not successful (step S105: NO), then in step S106, the MT of the IAB node 300-2(*a*) determines whether the timer T311 has expired. If the timer T311 has not expired (step S106: NO), the process returns to step S104.

If the timer T311 has expired (step S106: YES), then in step S107, the MT of the IAB node 300-2(*a*) notifies the BAP entity of the IAB node 300-2(*a*) of the expiry of the timer T311, and the BAP entity transmits the BH RLF notification message to the BAP entity of the IAB node 300-3(*a*).

In step S108, in response to the expiry of the timer T311, the MT of the IAB node 300-2(*a*) transitions from the RRC connected state to the RRC idle state.

Operation Example 2

In Operation Example 2, the IAB node 300 identifies the non-selected cell by use of system information broadcast by the child node as the cell information.

A method for the IAB node 300 to identify the non-selected cell by use of the system information broadcast by the child node will be described.

Firstly, the IAB node 300 (e.g., the IAB node 300-3(*a*) in FIG. 8) includes, in the system information broadcast by the cell managed by the DU of the IAB node 300, a list (hereinafter, referred to as the "parent node DU cell list") including the cell identifier of the parent node DU cell (i.e., the serving cell of the MT). When there is only one serving cell of the MT, the parent node DU cell list includes the cell identifier of the only one cell. The system information including the parent node DU cell list is, for example, information included in the system information block type 1 (SIB 1). Such system information is hereinafter referred to as "IAB system information".

The IAB system information includes at least a cell identifier of a cell that transmits (broadcasts) the IAB system information (hereinafter, referred to as the "source cell identifier") and the parent node DU cell list.

Secondly, the MT of the IAB node 300 (e.g., the IAB node 300-2(*a*) in FIG. 8) receives the IAB system information broadcast in an adjacent cell (e.g., a cell managed by the DU of the IAB node 300-3(*a*) in FIG. 8). When the parent node DU cell list included in the IAB system information includes the cell identifier of the cell managed by the DU of the IAB node 300, the MT determines that the adjacent cell is the child node DU cell of the IAB node 300. The MT identifies the adjacent cell as a non-selected cell.

The MT of the IAB node 300 may periodically check the IAB system information of the adjacent cell to store or update the cell identifier of the cell identified as the non-selected cell. The MT of the IAB node 300 excludes the stored non-selected cell from the targets to be re-established in performing the RRC re-establishment process in response to detecting the failure related to the upper node.

When the IAB node 300 includes a plurality of parent nodes, the MT of the IAB node 300 may include, in the IAB system information, an MT serving cell list corresponding to each of the plurality of parent nodes as an individual information element. The IAB node 300, once receiving such IAB system information, need not identify, even if the source cell of the IAB system information is determined as the child node DU cell, the cell as a non-selected cell.

For example, as illustrated in FIG. 8, the IAB node 300-3(*b*) makes a dual connection with the IAB node 300-2(*a*) as the MN and the IAB node 300-2(*b*) as the SN. In this case, the DU of the IAB node 300-3(*b*) includes, in the IAB system information, each of the MT serving cell list (MCG list) corresponding to the MN and the MT serving cell list (SCG list) corresponding to the SN as an individual information element. In such a case, the IAB node 300-2(*a*) determines the IAB node 300-3(*b*) as a child node based on the IAB system information received from the IAB node 300-3(*b*). However, since the IAB node 300-3(*b*) includes the SCG link and may possibly communicate with the donor gNB 200-1, the IAB node 300-2(*a*) does not identify the cell managed by the DU of the IAB node 300-3(*b*) as a non-selected cell.

The MT of the IAB node 300 may include, in the IAB system information broadcast by the DU of the IAB node 300, a list including the cell identifier of the child node DU cell (hereinafter, referred to as the child node DU cell list) determined as described above. The MT of the IAB node 300 receiving such IAB system information (the IAB system information including the parent node DU cell list and the child node DU cell list) may grasp the cells managed by the DUs not only of the child node of the IAB node 300 but also of the grandchild node of the IAB node 300, and identify these cells as non-selected cells. The MT of the IAB node 300 may include, in the IAB system information broadcast by the DU of the IAB node 300, the cell list of the cell managed by the DU of the grandchild node of the IAB node 300. The MT of the IAB node 300 receiving such IAB system information (the IAB system information including the parent node DU cell list, the child node DU cell list, and the grandchild node DU list) may grasp also the cells managed by the DUs of the child node, grandchild node, and great-grandchild node of the IAB node 300, and identify these cells as non-selected cells. Similarly, the DU of the IAB node 300 may broadcast the IAB system information including the parent node DU cell list, the child node DU cell list, the grandchild node DU cell list, the great-grandchild node DU cell list, and the like.

Figure 10:
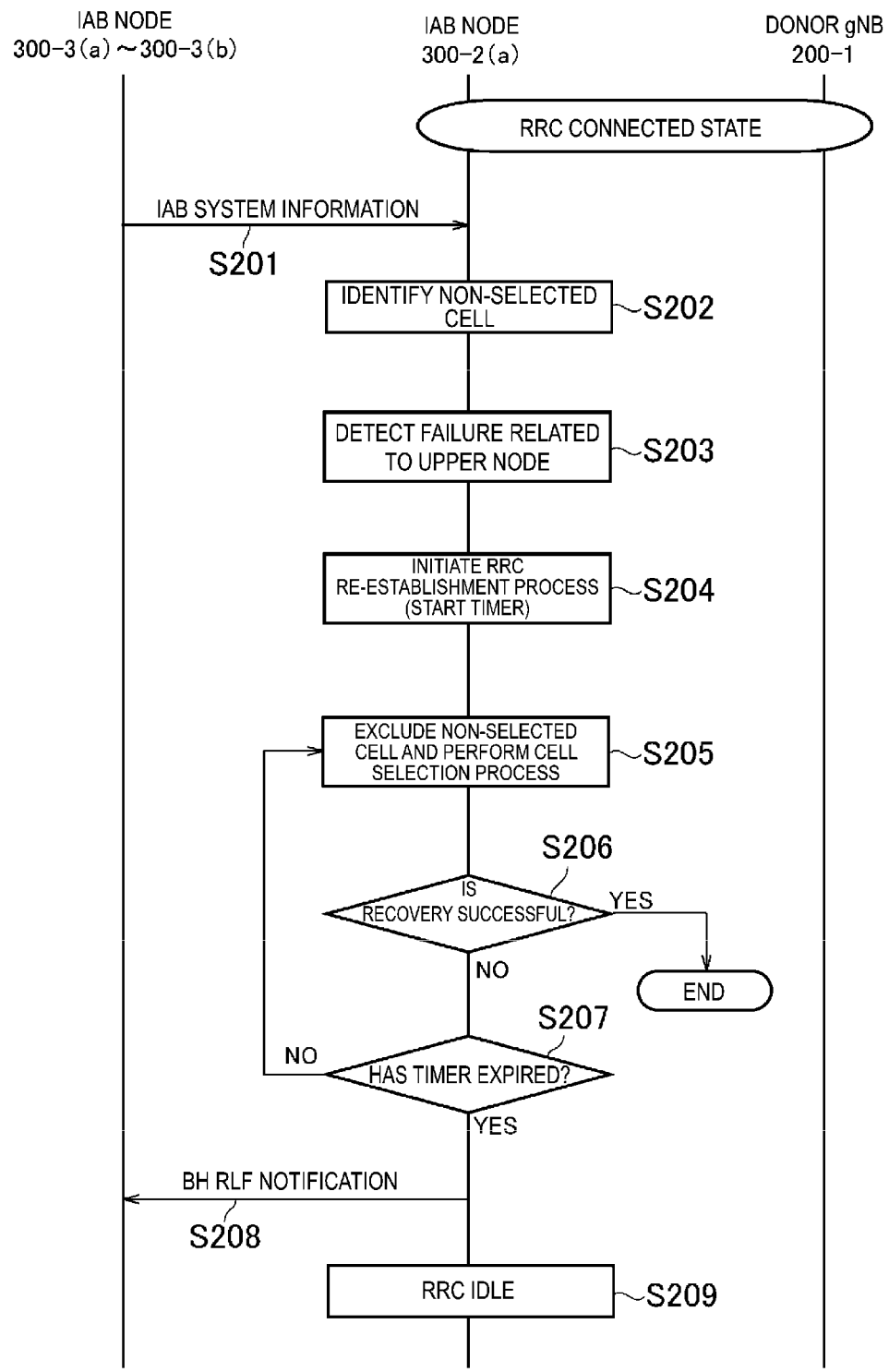
FIG. 10 is a diagram illustrating operations of Operation Example 2 according to the first embodiment.

FIG. 10 is a diagram illustrating operations of Operation Example 2. As illustrated in FIG. 10, the IAB node 300-2(*a*) initiates the process in an RRC connected state in which the IAB node 300-2(*a*) has an RRC connection with the donor gNB 200-1.

In step S201, the MT of the IAB node 300-2(*a*) receives the IAB system information from the cell managed by the DUs of the IAB nodes 300-3(*a*) to 300-3(*b*).

In step S202, the MT of the IAB node 300-2(*a*) identifies a non-selected cell by use of the IAB system information by the method described above. The MT stores the cell identifier of the identified cell.

The processes in steps S203 to S204 are similar to the processes in steps S102 to S103, so the descriptions thereof are omitted.

In step S205, the MT of the IAB node 300-2(*a*) performs cell search, and performs the exclusion process for excluding the cell identified by the cell identifier stored in step S202 (i.e., the cell identifier of the non-selected cell) among a plurality of searched cells. The MT performs the exclusion process like this, and then, selects an appropriate cell as a target for which the radio backhaul link is to be re-established.

The processes in steps S206 to S209 are similar to the processes in steps S105 to S108 in Operation Example 1, so the descriptions thereof are omitted.

The IAB system information according to Operation Example 2 (the IAB system information including the parent node DU cell list, the child node DU cell list, the grandchild node DU cell list, the great-grandchild node DU cell list, and/or the like) is also useful for the IAB node 300 that wants to newly join the IAB topology.

The IAB node 300 that wants to newly join the IAB topology, once receiving such IAB system information from the adjacent cell, can identify a cell of the DU of the IAB node 300 located relatively higher in the IAB topology (that is, a cell of the DU of the IAB node 300 with a small number of hops to the donor gNB 200-1). Such a cell is, for example, identified by the parent node DU cell list included in the IAB system information. The MT of the IAB node 300 establishes a radio backhaul link with the IAB node 300 managing such a cell. As a result, the MT of the IAB node 300 considers the IAB node 300 with a small number of hops to the donor gNB 200-1 as the parent node of the IAB node 300, and thus, can perform relay communication with less delay.

Operation Example 3

In Operation Example 3, the IAB node 300 identifies a non-selected cell by use of a list that is acquired from the child node and includes the cell identifier of the cell managed by the DU of the child node (hereinafter, referred to as the "DU cell list").

Figure 11:
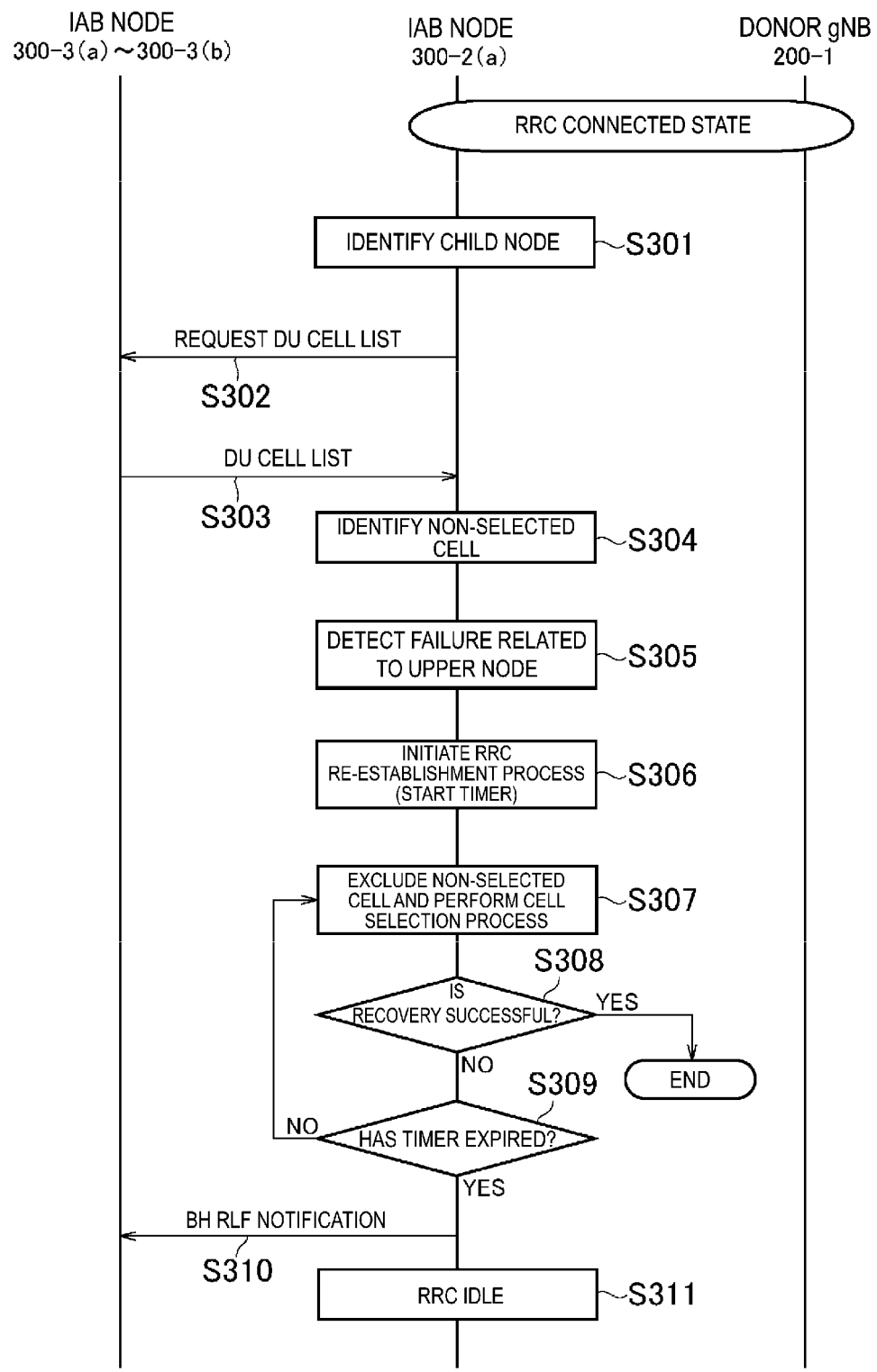
FIG. 11 is a diagram illustrating operations of Operation Example 3 according to the first embodiment.

FIG. 11 is a diagram illustrating operations of Operation Example 3. As illustrated in FIG. 11, the IAB node 300-2(*a*) initiates the process in an RRC connected state in which the IAB node 300-2(*a*) has an RRC connection with the donor gNB 200-1.

In step S301, the IAB node 300-2(*a*) identifies the IAB identifier of the child node of the IAB node 300-2(*a*) based on the routing configuration information received from the donor gNB 200-1. Here, the BAP entity of the IAB node 300-2(*a*) identifies the BAP address of the IAB node 300-3(*a*) and the BAP address of the IAB node 300-3(*b*) based on the routing configuration information.

In step S302, the IAB node 300-2(*a*) requests a DU cell list of each child node from the corresponding child node. Here, the BAP entity of the IAB node 300-2(*a*) transmits such a request to each of the BAP entity of the IAB node 300-3(*a*) and the BAP entity of the IAB node 300-3(*b*).

In step S303, the IAB node 300-2(*a*) receives the DU cell list of each child node as a response to the request for the DU cell list from the corresponding child node. Here, the BAP entity of the IAB node 300-2(*a*) receives the DU cell list of the IAB node 300-3(*a*) from the BAP entity of the IAB node 300-3(*a*), and receives the DU cell list of the IAB node 300-3(*b*) from the BAP entity of the IAB node 300-3(*b*).

The above-described request for the DU cell list and DU cell list may be transmitted and received by the BAP Control Protocol Data Unit (PDU).

In step S304, the MT of the IAB node 300-2(*a*) identifies the cell included in the DU cell list as the non-selected cell. The MT stores the cell identifier of the identified cell.

The processes in steps S305 to S311 are similar to the processes in steps S203 to S209 in Operation Example 2, so the descriptions thereof are omitted.

In Operation Example 3, once receiving the request for the DU cell list from the parent node, the IAB node 300 may request the DU cell list from the child node to receive the DU cell list of the child node. The IAB node 300 may transmit, to the parent node, the DU cell list of the IAB node 300 and the DU cell list of the child node of the IAB node 300 together as a response to the request for the DU cell list from the parent node. This may allow the parent node of the IAB node 300 to grasp the cells managed by the DUs of the child node and grandchild node of the IAB node 300, and identify these cells as non-selected cells.

In Operation Example 3, in comparison with Operation Example 2, the cell list is transmitted and received through dedicated BAP signaling (BAP Control PDU) between IAB nodes 300, and thus, the configuration of the IAB topology can be prevented from being externally leaked.

Operation Example 4

In Operation Example 4, the IAB node 300 acquires the DU cell list from the child node after detecting the BH RLF with the upper node. In other words, the IAB node 300 does not identify or store the non-selected cell before detecting the BH RLF but immediately identifies the non-selected cell in response to the BH RLF detection.

Figure 12:
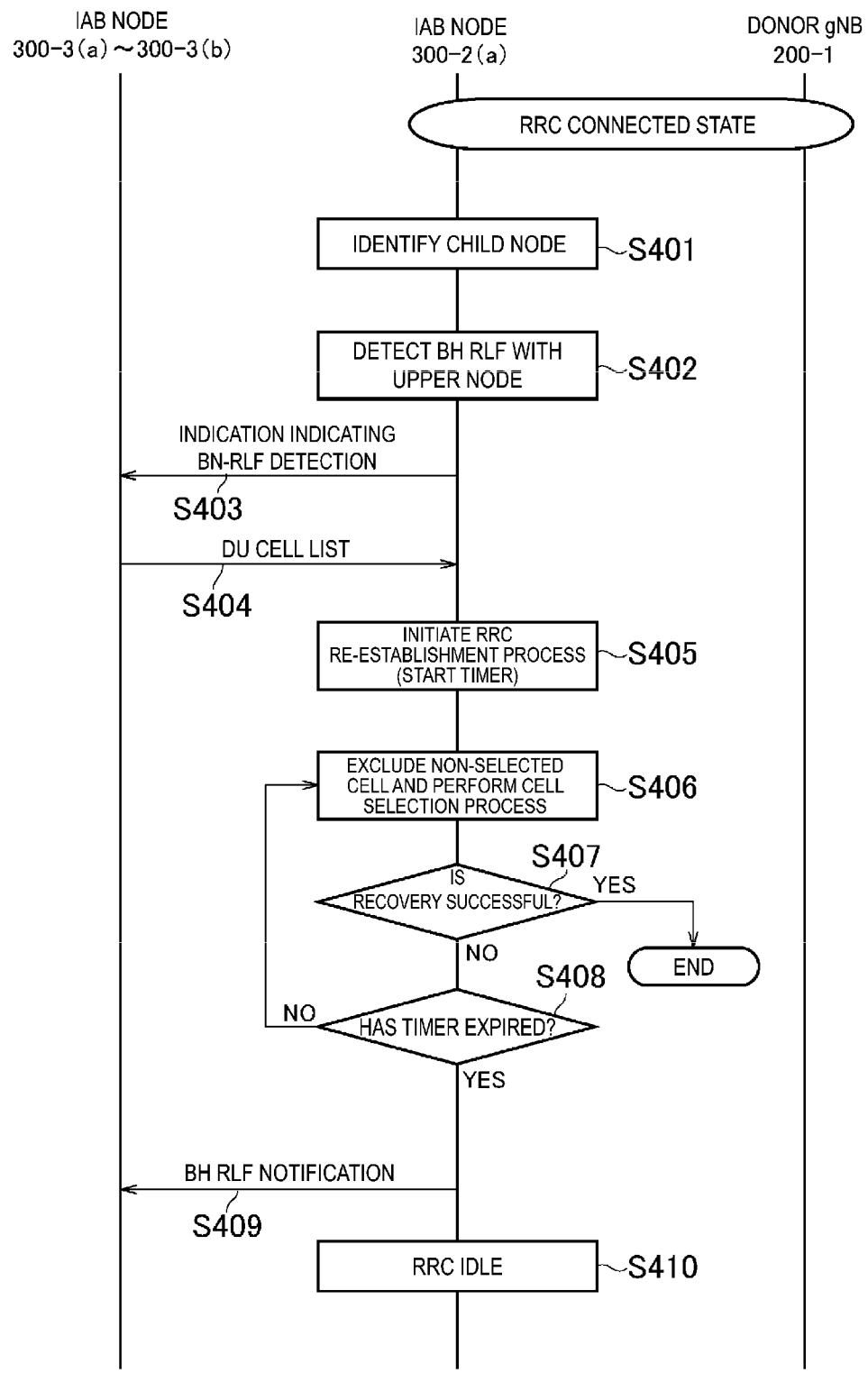
FIG. 12 is a diagram illustrating operations of Operation Example 4 according to the first embodiment.

FIG. 12 is a diagram illustrating operations of Operation Example 4. As illustrated in FIG. 12, the IAB node 300-2(*a*) initiates the process in an RRC connected state in which the IAB node 300-2(*a*) has an RRC connection with the donor gNB 200-1.

The process in steps S401 is similar to the process in step S301 in Operation Example 3, so the description thereof is omitted.

In step S402, the IAB node 300-2(*a*) detects a BH RLF with the upper node (the IAB node 300-1).

In step S403, the IAB node 300-2(*a*) transmits an indication indicating that the BH RLF with the upper node is detected to each child node. Here, the BAP entity of the IAB node 300-2(*a*) transmits such an indication to each of the BAP entity of the IAB node 300-3(a) and the BAP entity of the IAB node 300-3(b). The IAB node 300, once receiving such an indication from the parent node, transmits the DU cell list of the IAB node 300 to the parent node.

In step S404, the IAB node 300-2(a) receives the DU cell list of each child node from the corresponding child node. Here, the BAP entity of the IAB node 300-2(a) receives the DU cell list of the IAB node 300-3(a) from the BAP entity of the IAB node 300-3(a), and receives the DU cell list of the IAB node 300-3(b) from the BAP entity of the IAB node 300-3(b).

In step S405, the MT of the IAB node 300-2(a) initiates the RRC re-establishment process in order to re-establish the radio backhaul link of the IAB node 300-2(a). The MT starts the timer T311 and initiates the cell selection process (step S406).

In step S406, the MT of the IAB node 300-2(a) performs cell search, and identifies, as a non-selected cell, a cell included in the DU cell list received in step S404 among a plurality of searched cells. The MT performs the exclusion process for excluding the non-selected cell from the targets for which the radio backhaul link of the IAB node 300-2(a) is to be re-established. The MT performs the exclusion process like this, and then, selects an appropriate cell as a target for which the radio backhaul link is to be re-established.

The processes in steps S407 to S410 are similar to the processes in steps S306 to S311, so the descriptions thereof are omitted.

In Operation Example 4, once receiving the indication from the parent node, the IAB node 300 may request the DU cell list from the child node to receive the DU cell list of the child node. The IAB node 300 may transmit, to the parent node, the DU cell list of the IAB node 300 and the DU cell list of the child node of the IAB node 300 together. This may allow the parent node of the IAB node 300 to grasp the cells managed by the DUs of the child node and grandchild node of the IAB node 300, and identify these cells as non-selected cells.

In the first embodiment, the donor gNB 200-1 may transmit, to the IAB node 300, a list including a cell identifier of a permitted cell that is a cell permitted as a target for which the radio backhaul link is to be re-established (permitted cell list). For example, the donor gNB 200-1 configures the cell managed by the DU of the IAB node 300-2(b) as the permitted cell for the IAB node 300-2(a). The IAB node 300-2(b) is physically close to the IAB node 300-2(a) and includes a relay route to the donor gNB 200-1, so is suitable as the parent node of the IAB node 300-2(a).

In the first embodiment, the donor gNB 200-1 may configure only the permitted cell list, without configuring the prohibited cell list, for the IAB node 300 with a large number of descendant nodes (child node, grandchild node, great-grandchild node, and the like) (i.e., the IAB node 300 close to the donor gNB 200-1). The donor gNB 200-1 may configure only the prohibited cell list, without configuring the permitted cell list, for the IAB node 300 with a small number of descendant nodes (i.e., the IAB node 300 far from the donor gNB 200-1). This can prevent a size of the list (prohibited cell list or permitted cell list) from being large.

In the first embodiment, even when the cell identifier of the non-selected cell identified by the IAB node 300 matches the cell identifier of the permitted cell configured for to the IAB node 300, the IAB node 300 itself excludes the cell having the cell identifier from the targets for which the radio backhaul link is to be re-established.

In the first embodiment, the IAB node 300 may transmit the DU cell list to the parent node even in the absence of a request for the DU cell list from the parent node. For example, when a cell managed by the DU of the IAB node 300 is added, changed, or deleted, the IAB node 300 transmits the DU cell list, and the parent node receives the DU cell list. Note that such addition, change, and deletion of the cell are configured between the IAB node 300 and the donor gNB 200-1 by using the F1AP message.

Second Embodiment

A second embodiment will be described below. The second embodiment relates to the IAB node 300 in the IAB topology described above transitioning from the RRC connected state to the RRC inactive state.

In the second embodiment, the IAB node 300 establishes the BAP entity in accordance with the RRC message from the donor gNB 200-1 in the RRC connected state in which the IAB node 300 has the RRC connection with the donor gNB 200-1. Even when the IAB node 300 transitions from the RRC connected state to the RRC inactive state, the IAB node 300 performs control to not release but maintain the BAP entity. Note that, when the IAB node 300 transitions from the RRC connected state to the RRC idle state, the IAB node 300 releases the BAP entity.

In the control to not release but maintain the BAP entity, the BAP entity of IAB node 300 continues to perform the routing process to select the BH RLC channel.

The BH RLC channel is mapped to the radio backhaul link. A plurality of BH RLC channels are mapped to one radio backhaul link. Each of the plurality of BH RLC channels is assigned with a different priority. The BH RLC channel selection allows for prioritization specific to a traffic on the radio backhaul links.

Figure 13:
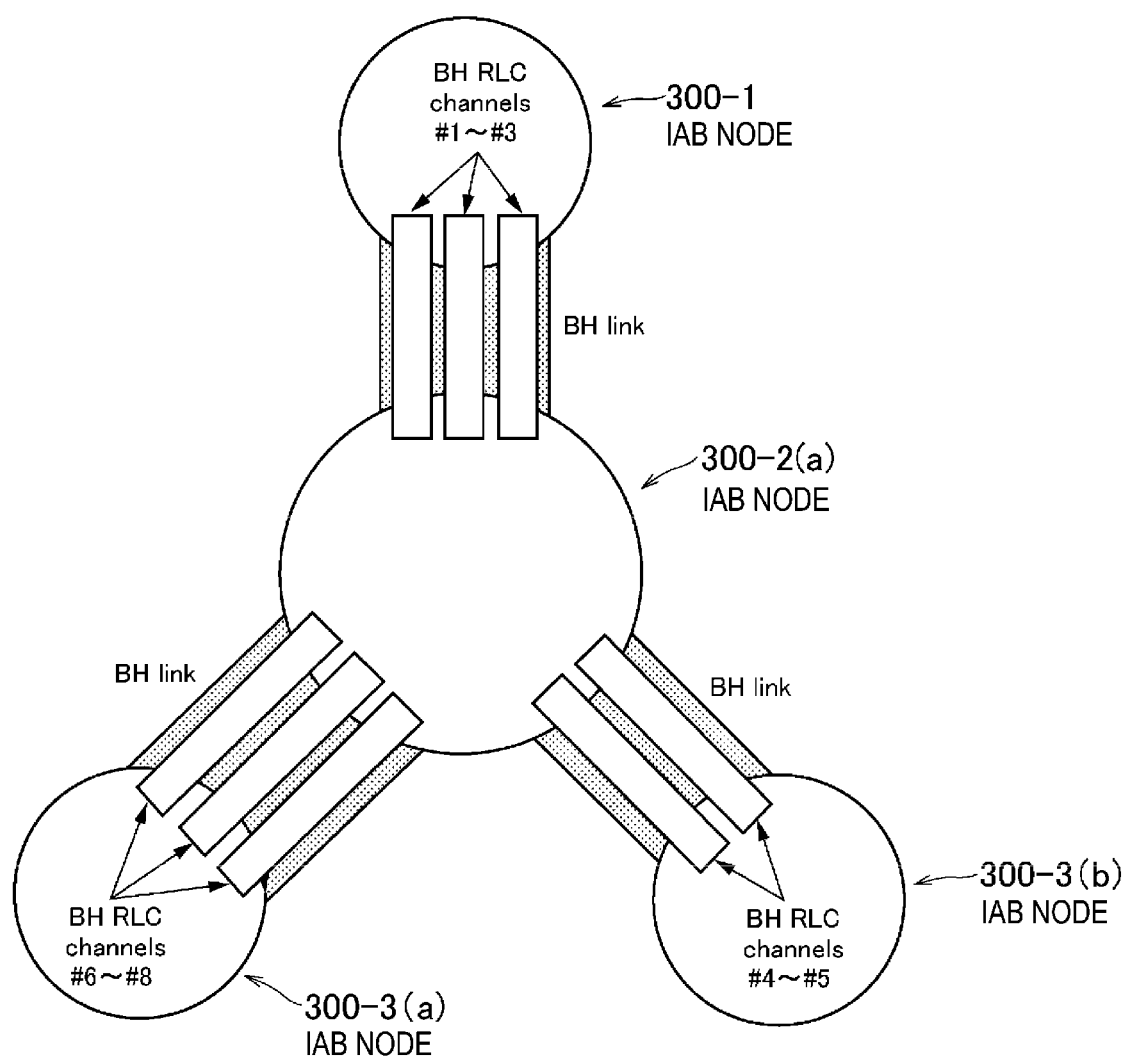
FIG. 13 is a diagram illustrating a BH RLC channel according to a second embodiment.

The BH RLC channel selection will be described below using FIG. 13. FIG. 13 is a diagram illustrating the BH RLC channel according to the second embodiment.

As illustrated in FIG. 13, three BH RLC channels (BH RLC channels #1 to #3) are mapped on a radio backhaul link between the IAB node 300-2(a) and the IAB node 300-1. The BH RLC channels #1 to #3 are assigned with different priorities. Two BH RLC channels (BH RLC channels #4 and #5) are mapped on a radio backhaul link between the IAB node 300-2(a) and the IAB node 300-3(b). The BH RLC channels #4 to #5 are assigned with different priorities. Three BH RLC channels (BH RLC channels #6 to #8) are mapped on a radio backhaul link between the IAB node 300-2(a) and the IAB node 300-3(a). The BH RLC channels #6 to #8 are assigned with different priorities.

The IAB node 300-2(a) establishes the BH RLC channels #1 to #8 based on BH RLC channel configuration information. The BH RLC channel configuration information is transmitted from the donor gNB 200-1 to the IAB node 300-2(a) by the RRC message or the F1AP message. The BH RLC channel configuration information includes information indicating a channel identifier of each of the BH RLC channels, information indicating mapping of each of the BH RLC channels on the radio backhaul link, and information indicating the priority of each of the BH RLC channels.

In the second embodiment, the BAP entity of the IAB node 300 performs the routing process based on the BH RLC channel configuration information and the routing configuration information on data packets received from the adjacent IAB node 300 (parent node or child node).

Such a routing process will be described.

Firstly, the BAP entity of the IAB node 300 identifies a NEXT HOP based on the root identifier of the specified relay route for the data packets and the routing configuration information, and identifies a radio backhaul link to which the data packets are to be output.

Secondly, the BAP entity of the IAB node 300 selects a BH RLC channel to which the data packets are to be output based on the priority of the data packets and the BH RLC channel configuration information.

Thirdly, the BAP entity of the IAB node 300 outputs the data packets to the selected BH RLC channel.

Figure 14:
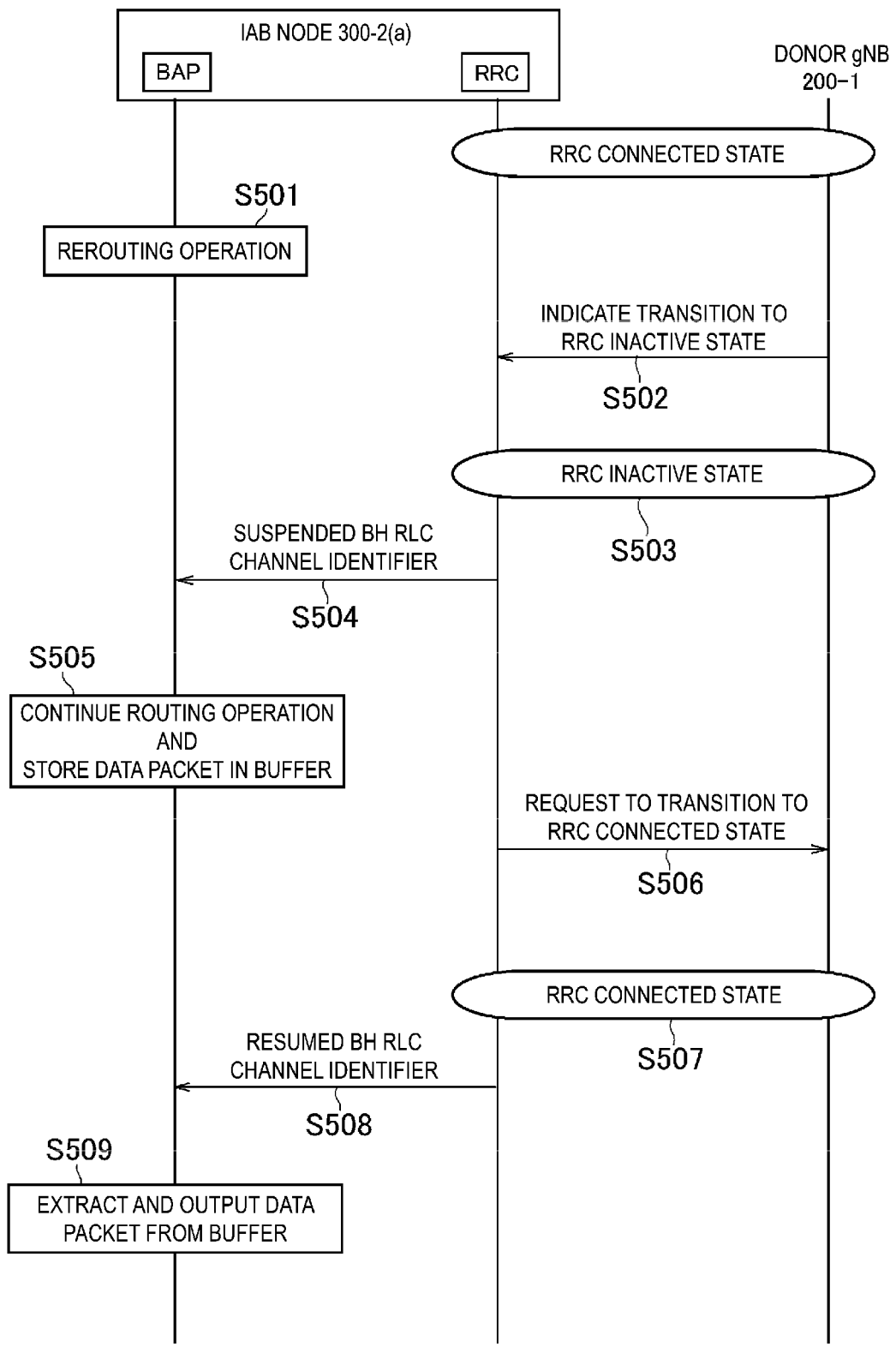
FIG. 14 is a diagram illustrating operations according to the second embodiment.

FIG. 14 is a diagram illustrating operations according to the second embodiment. As illustrated in FIG. 14, the IAB node 300-2(a) initiates the process in an RRC connected state in which the IAB node 300-2(a) has an RRC connection with the donor gNB 200-1. The IAB node 300-2(a) includes an RRC entity and a BAP entity established in response to an RRC message from the donor gNB 200-1.

In step S501, the BAP entity of the IAB node 300-2(a) performs the routing process based on the BH RLC channel configuration information and the routing configuration information.

In step S502, the RRC entity of the IAB node 300-2(a) receives a message indicating a transition to an RRC inactive state from the donor gNB 200-1. Such a message is, for example, an RRC Release message including Suspended indication (Suspend Config).

In step S503, the IAB node 300-2(a) transitions to the RRC inactive state. Here, in response to the IAB node 300-2(a) transitioning to the RRC inactive state, the BH RLC channels (BH RLC channels #1 to #3) in the upstream direction of the IAB node 300-2(a) are suspended.

The fact that the BH RLC channel is suspended means that the BH RLC channel is temporarily unavailable with the configuration information of the BH RLC channel (the channel identifier, mapping to the radio backhaul link, the priority, and the like) being maintained.

In step S504, the RRC entity of the IAB node 300-2(a) notifies the BAP entity of the IAB node 300-2(a) of the identifiers of the suspended BH RLC channels (BH RLC channels #1 to #3). The RRC entity may notify the BAP entity that the IAB node 300-2(a) transitions to the RRC inactive state.

In step S505, the BAP entity of the IAB node 300-2(a) continues the routing process.

The BAP entity receives the data packets from the child nodes (IAB node 300-3(a), IAB node 300-3(b)) of the IAB node 300-2(a) and continues the routing process for the data packets. In the routing process, when selecting the suspended BH RLC channel (e.g., BH RLC channel #1), the BAP entity stores the data packet to be output to the BH RLC channel in a buffer of the BAP entity.

The BAP entity continuously performs the routing process for the data packet received from the parent node before the IAB node 300-2(a) transitions to the RRC inactive state. The BAP entity selects the BH RLC channels not suspended (BH RLC channels #4 to #8) for such a data packet, and outputs the data packet to the selected BH RLC channel.

In step S506, the RRC entity of the IAB node 300-2(a) transmits a message requesting transition to the RRC connected state to the donor gNB 200-1. Such a message is, for example, an RRC Resume Request message. When the amount of data packets stored in the buffer of the BAP entity is greater than or equal to a threshold value, the RRC entity may transmit the message requesting transition to the RRC connected state to the donor gNB 200-1.

In step S507, the IAB node 300-2(a) transitions to the RRC connected state. Here, in response to the IAB node 300-2(a) transitioning to the RRC connected state, the suspended BH RLC channels (BH RLC channels #1 to #3) are resumed.

In step S508, the RRC entity of the IAB node 300-2(a) notifies the BAP entity of the IAB node 300-2(a) of the identifiers of the resumed BH RLC channels (BH RLC channels #1 to #3). The RRC entity may notify the BAP entity that the IAB node 300-2(a) transitions to the RRC connected state.

In step S509, the BAP entity of the IAB node 300-2(a) extracts, from the buffer, data packets to be output to the BH RLC channels (BH RLC channels #1 to #3) suspended during the period while the IAB node 300-2(a) is in the RRC inactive state, and outputs the extracted data packets to the corresponding BH RLC channels.

Here, the BAP entity may perform the routing process again for the extracted data packets.

OTHER EMBODIMENTS

A program causing a computer to execute the processes performed by the IAB node 300 or the donor gNB 200-1 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like.

Circuits for executing the processes to be performed by the IAB node 300 or the donor gNB 200-1 may be integrated, and at least part of the IAB node 300 or the donor gNB 200-1 may be configured as a semiconductor integrated circuit (a chipset or an SoC).

Embodiments have been described above in detail with reference to the drawings, but specific configurations are not limited to those described above, and various design variation can be made without departing from the gist of the present disclosure.

The invention claimed is:

1. A communication control method comprising:
    establishing, by a relay node configured to relay communication between user equipment and a donor base station, a Backhaul Adaptation Protocol (BAP) entity in response to a Radio Resource Control (RRC) message from the donor base station, in an RRC connected state in which the relay node has an RRC connection with the donor base station;
    transitioning, by the relay node, from the RRC connected state to an RRC inactive state;
    performing, by the relay node, control to not release but maintain the BAP entity even when the relay node transitions to the RRC inactive state;
    establishing, by the relay node, a plurality of Radio Link Control (RLC) channels for relaying the communication;
    performing, by the BAP entity, a routing process of selecting one of the plurality of RLC channels as an RLC channel to which a data packet is to be output in the communication; and in response to the selected RLC channel being unavailable, storing, by the BAP entity, the data packet to be output to the selected RLC channel in a buffer of the BAP entity.

2. The communication control method according to claim 1, further comprising:
transitioning, by the relay node, from the RRC inactive state to the RRC connected state; and
outputting, by the BAP entity, the data packet stored in the buffer to the selected RLC channel when the selected RLC channel becomes available again.

3. The communication control method according to claim 1, wherein
the performing the control comprises notifying the BAP entity, from an RRC entity in the relay node, of information identifying the unavailable RLC channel.

4. A relay node for relaying communication between user equipment and a donor base station, the relay node comprising:
a controller configured to establish a Backhaul Adaptation Protocol (BAP) entity in response to a Radio Resource Control (RRC) message from the donor base station, in an RRC connected state in which the relay node has an RRC connection with the donor base station, wherein
the controller is configured to make the relay node transition from the RRC connected state to an RRC inactive state,
the controller is configured to perform control to not release but maintain the BAP entity even when making the relay node transition to the RRC inactive state, and
the controller is configured to establish a plurality of Radio Link Control (RLC) channels for relaying the communication, wherein the BAP entity is configured to perform a routing process of selecting one of the plurality of RLC channels as an RLC channel to which a data packet is to be output in the communication, and
the BAP entity is configured to, in response to the selected RLC channel being unavailable, store the data packet to be output to the selected RLC channel in a buffer of the BAP entity.

5. A chipset for a relay node for relaying communication between user equipment and a donor base station, the chipset configured to execute processing of:
establishing a Backhaul Adaptation Protocol (BAP) entity in response to a Radio Resource Control (RRC) message from the donor base station, in an RRC connected state in which the relay node has an RRC connection with the donor base station;
transitioning from the RRC connected state to an RRC inactive state;
performing control to not release but maintain the BAP entity even when the relay node transitions to the RRC inactive state;
establishing a plurality of Radio Link Control (RLC) channels for relaying the communication;
performing a routing process of selecting one of the plurality of RLC channels as an RLC channel to which a data packet is to be output in the communication; and
in response to the selected RLC channel being unavailable, storing the data packet to be output to the selected RLC channel in a buffer of the BAP entity.

* * * * *